US008407660B2

(12) United States Patent
Solomon

(10) Patent No.: US 8,407,660 B2
(45) Date of Patent: *Mar. 26, 2013

(54) INTERCONNECT ARCHITECTURE IN THREE DIMENSIONAL NETWORK ON A CHIP

(76) Inventor: Neal Solomon, Oakland, CA (US)

( * ) Notice: Subject to any disclaimer, the term of this patent is extended or adjusted under 35 U.S.C. 154(b) by 1220 days.

This patent is subject to a terminal disclaimer.

(21) Appl. No.: 12/283,576

(22) Filed: Sep. 12, 2008

(65) Prior Publication Data

US 2009/0070549 A1 Mar. 12, 2009

Related U.S. Application Data

(60) Provisional application No. 60/993,639, filed on Sep. 12, 2007.

(51) Int. Cl.
*G06F 17/50* (2006.01)
(52) U.S. Cl. .......................... 716/138; 716/126; 716/129
(58) Field of Classification Search .................... 716/30, 716/100, 118, 119, 126, 129, 130, 138; 370/25, 370/231, 389, 392; 712/10
See application file for complete search history.

(56) References Cited

U.S. PATENT DOCUMENTS

| 5,737,628 A * | 4/1998 | Birrittella et al. ............... 712/11 |
| 5,797,035 A * | 8/1998 | Birrittella et al. ............... 710/35 |
| 8,001,266 B1 * | 8/2011 | Gonzalez et al. ............. 709/238 |
| 2004/0103218 A1 * | 5/2004 | Blumrich et al. ............. 709/249 |

OTHER PUBLICATIONS

MIRA: A Multi-Layered On-Chip Interconnect Router Architecture*, Park et al., MARCO / DARPA Gigascale Systems Research Center, Feb. 2, 2007, pp. 1-11.*
A Novel Dimensionally-Decomposed Router for On-Chip Communication in 3D Architectures * , Kim et al., ACM, Jun. 9-13, 2007, pp. 1-12.*
Quadrant-Based XYZ Dimension Order Routing Algorithm for 3-D Asymmetric Torus Routing Chip (ATRC), Khan et al., IEEE, Feb. 2011, pp. 1-4.*

* cited by examiner

*Primary Examiner* — Vuthe Siek

(57) ABSTRACT

The connection architecture of a network on a chip (NoC) is described in which (a) nodes in octahedron sections are connected in an arc Benes network, (b) a hierarchy of node clusters are connected using a globally asynchronous locally asynchronous (GALA) configuration, (c) a double wishbone 2D torus ring is applied to connection between network layers and (d) data is routed using buffer modulation.

19 Claims, 12 Drawing Sheets m = 8 r = 34
Input nodes -
Output switches n = 4

Inner core network
(Input switches)
(Highest bandwidth)

(Middle switches)
Neighborhood
(2-way switches)

Node 1

INTERCONNECT ARCHITECTURE IN THREE DIMENSIONAL NETWORK ON A CHIP

CROSS-REFERENCES TO RELATED APPLICATIONS

The present application claims the benefit of priority under 35 U.S.C. §119 from U.S. Provisional Patent Application Ser. No. 60/993,639, filed on Sep. 12, 2007, the disclosure of which is hereby incorporated by reference in their entirety for all purposes.

FIELD OF INVENTION

The invention involves system on chip (SoC) and network on chip (NoC) semiconductor technology. The system is a three dimensional (3D) super computer on a chip (SCOC) and involves multiple processors on silicon (MPSOC) and a system on a programmable chip (SOPC). Components of the present invention involve micro-electro mechanical systems (MEMS) and nano-electro-mechanical systems (NEMS). Because the system is a hybrid heterostructure semiconductor device that incorporates synthetic computer interconnect network fabrics, the system is exemplar of polymorphous computing architecture (PCA) and cognitive computing.

BACKGROUND

The challenge of modern computing is to build economically efficient chips that incorporate more transistors to meet the goal of achieving Moore's law of doubling performance every two years. The limits of semiconductor technology are affecting this ability to grow in the next few years, as transistors become smaller and chips become bigger and hotter. The semiconductor industry has developed the system on a chip (SoC) as a way to continue high performance chip evolution.

So far, there have been four main ways to construct a high performance semiconductor. First, chips have multiple cores. Second, chips optimize software scheduling. Third, chips utilize efficient memory management. Fourth, chips employ polymorphic computing. To some degree, all of these models evolve from the Von Neumann computer architecture developed after WWII in which a microprocessor's logic component fetches instructions from memory.

The simplest model for increasing chip performance employs multiple processing cores. By multiplying the number of cores by eighty, Intel has created a prototype teraflop chip design. In essence, this architecture uses a parallel computing approach similar to supercomputing parallel computing models. Like some supercomputing applications, this approach is limited to optimizing arithmetic-intensive applications such as modeling.

The Tera-op, Reliable, Intelligently Adaptive Processing System (TRIPS), developed at the University of Texas with funding from DARPA, focuses on software scheduling optimization to produce high performance computing. This model's "push" system uses data availability to fetch instructions, thereby putting additional pressure on the compiler to organize the parallelism in the high speed operating system. There are three levels of concurrency in the TRIPS architecture, including instruction-level parallelism (ILP), thread-level parallelism (TLP) and data-level parallelism (DLP). The TRIPS processor will process numerous instructions simultaneously and map them onto a grid for execution in specific nodes. The grid of execution nodes is reconfigurable to optimize specific applications. Unlike the multi-core model, TRIPS is a uniprocessor model, yet it includes numerous components for parallelization.

The third model is represented by the Cell microprocessor architecture developed jointly by the Sony, Toshiba and IBM (STI) consortium. The Cell architecture uses a novel memory "coherence" architecture in which latency is overcome with a bandwidth priority and in which power usage is balanced with peak computational usage. This model integrates a microprocessor design with coprocessor elements; these eight elements are called "synergistic processor elements" (SPEs). The Cell uses an interconnection bus with four unidirectional data flow rings to connect each of four processors with their SPEs, thereby meeting a teraflop performance objective. Each SPE is capable of producing 32 GFLOPS of power in the 65 nm version, which was introduced in 2007.

The MOrphable Networked Micro-ARCHitecture (MONARCH) uses six reduced instruction set computing (RISC) microprocessors, twelve arithmetic clusters and thirty-one memory clusters to achieve a 64 GFLOPS performance with 60 gigabytes per second of memory. Designed by Raytheon and USC/ISI from DARPA funding, the MONARCH differs distinctly from other high performance SoCs in that it uses evolvable hardware (EHW) components such as field programmable compute array (FPCA) and smart memory architectures to produce an efficient polymorphic computing platform.

MONARCH combines key elements in the high performance processing system (HPPS) with Data Intensive Architecture (DIVA) Processor in Memory (PIM) technologies to create a unified, flexible, very large scale integrated (VLSI) system. The advantage of this model is that reprogrammability of hardware from one application-specific integrated circuit (ASIC) position to another produces faster response to uncertain changes in the environment. The chip is optimized to be flexible to changing conditions and to maximize power efficiency (3-6 GFLOPS per watt). Specific applications of MONARCH involve embedded computing, such as sensor networks.

These four main high performance SoC models have specific applications for which they are suited. For instance, the multi-core model is optimized for arithmetic applications, while MONARCH is optimized for sensor data analysis. However, all four also have limits.

The multi-core architecture has a problem of synchronization of the parallel micro-processors that conform to a single clocking model. This problem limits their responsiveness to specific types of applications, particularly those that require rapid environmental change. Further, the multi-core architecture requires "thread-aware" software to exploit its parallelism, which is cumbersome and produces quality of service (QoS) problems and inefficiencies.

By emphasizing its compiler, the TRIPS architecture has the problem of optimizing the coordination of scheduling. This bottleneck prevents peak performance over a prolonged period.

The Cell architecture requires constant optimization of its memory management system, which leads to QoS problems.

Finally, MONARCH depends on static intellectual property (IP) cores that are limited to combinations of specified pre-determined ASICs to program its evolvable hardware components. This restriction limits the extent of its flexibility, which was precisely its chief design advantage.

In addition to SoC models, there is a network on a chip (NoC) model, introduced by Arteris in 2007. Targeted to the communications industry, the 45 nm NoC is a form of SoC that uses IP cores in FPGAs for reprogrammable functions and that features low power consumption for embedded computing applications. The chip is optimized for on-chip communications processing. Though targeted at the communications industry, particularly wireless communications, the chip has limits of flexibility that it was designed to overcome, primarily in its deterministic IP core application software.

Various implementations of FPGAs represent reconfigurable computing. The most prominent examples are the Xilinx Virtex-II Pro and Virtex-4 devices that combine one or more microprocessor cores in an FPGA logic fabric. Similarly, the Atmel FPSLIC processor combines an AVR processor with programmable logic architecture. The Atmel microcontroller has the FPGA fabric on the same die to produce a fine-grained reconfigurable device. These hybrid FPGAs and embedded microprocessors represent a generation of system on a programmable chip (SOPC). While these hybrids are architecturally interesting, they possess the limits of each type of design paradigm, with restricted microprocessor performance and restricted deterministic IP core application software. Though they have higher performance than a typical single core microprocessor, they are less flexible than a pure FPGA model.

All of these chip types are two dimensional planar micro system devices. A new generation of three dimensional integrated circuits and components is emerging that is noteworthy as well. The idea to stack two dimensional chips by sandwiching two or more ICs using a fabrication process required a solution to the problem of creating vertical connections between the layers. IBM solved this problem by developing "through silicon vias" (TSVs) which are vertical connections "etched through the silicon wafer and filled with metal." This approach of using TSVs to create 3D connections allows the addition of many more pathways between 2D layers. However, this 3D chip approach of stacking existing 2D planar IC layers is generally limited to three or four layers. While TSVs substantially limit the distance that information traverses, this stacking approach merely evolves the 2D approach to create a static 3D model.

In U.S. Pat. No. 5,111,278, Echelberger describes a 3D multi-chip module system in which layers in an integrated circuit are stacked by using aligned TSVs. This early 3D circuit model represents a simple stacking approach. U.S. Pat. No. 5,426,072 provides a method to manufacture a 3D IC from stacked silicon on insulation (SOI) wafers. U.S. Pat. No. 5,657,537 presents a method of stacking two dimensional circuit modules and U.S. Pat. No. 6,355,501 describes a 3D IC stacking assembly technique.

Recently, 3D stacking models have been developed on chip in which several layers are constructed on a single complementary metal oxide semiconductor (CMOS) die. Some models have combined eight or nine contiguous layers in a single CMOS chip, though this model lacks integrated vertical planes. MIT's microsystems group has created 3D ICs that contain multiple layers and TSVs on a single chip.

3D FPGAs have been created at the University of Minnesota by stacking layers of single planar FPGAs. However, these chips have only adjacent layer connectivity.

3D memory has been developed by Samsung and by BeSang. The Samsung approach stacks eight 2-Gb wafer level processed stack packages (WSPs) using TSVs in order to minimize interconnects between layers and increase information access efficiency. The Samsung TSV method uses tiny lasers to create etching that is later filled in with copper. BeSang combines 3D package level stacking of memory with a logic layer of a chip device using metal bonding.

See also U.S. Pat. No. 5,915,167 for a description of a 3D DRAM stacking technique, U.S. Pat. No. 6,717,222 for a description of a 3D memory IC, U.S. Pat. No. 7,160,761 for a description of a vertically stacked field programmable nonvolatile memory and U.S. Pat. No. 6,501,111 for a description of a 3D programmable memory device.

Finally, in the supercomputing sphere, the Cray T3D developed a three dimensional supercomputer consisting of 2048 DEC Alpha chips in a torus networking configuration.

In general, all of the 3D chip models merely combine two or more 2D layers. They all represent a simple bonding of current technologies. While planar design chips are easier to make, they are not generally high performance.

Prior systems demonstrate performance limits, programmability limits, multi-functionality limits and logic and memory bottlenecks. There are typically trade-offs of performance and power.

The present invention views the system on a chip as an ecosystem consisting of significant intelligent components. The prior art for intelligence in computing consists of two main paradigms. On the one hand, the view of evolvable hardware (EHW) uses FPGAs as examples. On the other hand, software elements consist of intelligent software agents that exhibit collective behaviors. Both of these hardware and software aspects take inspiration from biological domains.

First, the intelligent SoC borrows from biological concepts of post-initialized reprogrammability that resembles a protein network that responds to its changing environmental conditions. The interoperation of protein networks in cells is a key behavioral paradigm for the SoC. The slowly evolving DNA root structure produces the protein network elements, yet the dynamics of the protein network are interactive with both itself and its environment.

Second, the elements of the SoC resemble the subsystems of a human body. The circulatory system represents the routers, the endocrine system is the memory, the skeletal system is comparable to the interconnects, the nervous system is the autonomic process, the immune system provides defense and security as it does in a body, the eyes and ears are the sensor network and the muscular system is the bandwidth. In this analogy, the brain is the central controller.

For the most part, SoCs require three dimensionality in order to achieve high performance objectives. In addition, SoCs require multiple cores that are reprogrammable so as to maintain flexibility for multiple applications. Such reprogrammability allows the chip to be implemented cost effectively. Reprogrammability, moreover, allows the chip to be updatable and future proof. In some versions, SoCs need to be power efficient for use in embedded mobile devices. Because they will be prominent in embedded devices, they also need to be fault tolerant. By combining the best aspects of deterministic microprocessor elements with indeterministic EHW elements, an intelligent SoC efficiently delivers superior performance.

While the design criteria are necessary, economic efficiency is also required. Computational economics reveals a comparative cost analysis that includes efficiency maximization of (a) power, (b) interconnect metrics, (c) transistor per memory metrics and (d) transistor per logic metrics.

Problems that the System Solves

Optimization problems that the system solves can be divided into two classes: bi-objective optimization problems (BOOPs) and multi-objective optimization problems (MOOPs).

BOOPs consist of trade-offs in semiconductor factors such as (a) energy consumption versus performance, (b) number of transistors versus heat dissipation, (c) interconnect area versus performance and (d) high performance versus low cost.

Regarding MOOPs, the multiple factors include: (a) thermal performance (energy/heat dissipation), (b) energy optimization (low power use), (c) timing performance (various metrics), (d) reconfiguration time (for FPGAs and CPLDs), (e) interconnect length optimization (for energy delay), (f) use of space, (g) bandwidth optimization and (h) cost (manufacture and usability) efficiency. The combination of solutions to trade-offs of multiple problems determines the design of specific semiconductors. The present system presents a set of solutions to these complex optimization problems.

One of the chief problems is to identify ways to limit latency. Latency represents a bottleneck in an integrated circuit when the wait to complete a task slows down the efficiency of the system. Examples of causes of latency include interconnect routing architectures, memory configuration and interface design. Limiting latency problems requires the development of methods for scheduling, anticipation, parallelization, pipeline efficiency and locality-priority processing.

Summary

The present invention features a network on a chip (NoC) in the form of a dynamic 3D intelligent system on a chip (iSoC). Chip network topology, routing architecture and flow dynamics are critical to the performance of the 3D iSoC. The 3D iSoC features novel networking features involving the structure and function of interconnects that markedly improve efficiency relative to other models.

The present invention describes a hybrid network that shares direct and indirect network architectures. In direct networks, each node is connected by a router to each other node, while in indirect networks, each node is connected to a switch which is then connected to other switches which connect to other nodes.

The network model used in the present invention is a hierarchical synthesis of direct and indirect networks. Each octagonal neighborhood has direct point-to-point connections via embedded routers between nodes, while each neighborhood has a switch that connects to both other neighborhoods and to the central core. This configuration benefits the independent operation of each neighborhood as well as the overall operation of the whole chip.

Analogous of the network configuration of the 3D iSoC is the structure and operation of a city. In the center core is a bigger set of larger buildings, while the periphery has multiple independent neighborhoods with smaller buildings. The city has different districts, such as warehouse district (memory), industrial district, shopping district, wholesale district and so on that perform specific functions. Overall, the city combines multiple different functions into a complex whole.

Further employing the analogy, the transportation system of the city is critical to the overall operation. Regarding the structure of the transportation system, a large highway will generally encircle a downtown center, with major arteries leading to the suburbs. Workers will travel from their homes to their offices in cars, buses and trains. The people are like individual data sets distributed in data packets of differentiated size (car versus a train). Organization, and reorganization, of traffic flows in the transportation subsystems determine the healthy functioning of the city. If a road is blocked, traffic backs up and a bottleneck is created. In this event, traffic is rerouted around the disruption. Once the roadway is cleared, traffic will resume its ordinary operations.

In the case of the 3D architecture of an intelligent SoC, multiple dimensions of symmetry extend the analogy. The chip's interconnects are the highways, yet in the 3D context they are even more analogous to the symmetrical functioning of the circulatory system of the body.

The present system introduces a hybrid 3D network in a SoC. The network consists of (a) an arc Benes network for rearrangable intra-neighborhood structure, (b) a 3D clos network with medium bandwidth to connect neighborhoods with hybrid synchronization, (c) globally asynchronous locally asynchronous (GALA) connections using crossbars to connect the central node to the neighborhoods (d) a multi-layer mesochronous communications matrix and (e) a double wishbone 2D torus model with highest bandwidth connecting the main quadrants.

The present disclosure describes solutions to problems involving interconnect structure and dynamics and routing constraints in the 3D environment of a ULSI circuit.

Novelties

The SoC is structured as a dynamic network in which clusters of connection nodes produce a variable configuration contingent on system demands. Continuous network optimization is performed by adaptive routing mechanisms. The hybrid networking system is also scalable.

Advantages of the Present System

The system uses efficient interconnect configurations for maximum energy conservation and energy leakage loss minimization. The increased number of symmetrically configured interconnections in a complex SoC with multiple multi-layer nodes also enables faster throughput, which leads to high performance.

The system makes possible polymorphous computing by employing a hybrid network control model that allows for a globally asynchronous locally asynchronous (GALA) hierarchical computing architecture. The clock speeds of the individual octahedron neighborhoods are variable, which leads to modulated, and efficient, power consumption.

Description of the Invention (I) Intra-SoC Network Architecture (1) Hybrid Network Fabric Integrating 3D Geodesic Interconnect Typology The 3D NoC is fundamentally a network of interconnects distributed between logic and memory components. Interconnects embedded in the circuits link the logic circuitry and the memory circuitry to each layer, while the vias connect the circuitry of one layer of a 3D chip to other layers. Interconnects between chips provide the communications capacity for the SoC to operate as a network with a common switching fabric. Because the SoC is three dimensional, it uses a geodesic configuration to connect the various 3D nodes in Euclidean space using x, y and z dimensions.

Like a cube, the 3D aspect of the chip has six facades with eight corners. The eight corners correspond to a neighborhood cluster of circuit nodes, though the composition of each neighborhood cluster is variable. This configuration into neighborhood clusters allows each cluster to behave autonomously while also interacting with other clusters. The cluster configuration allows multiple nodes to operate independently and in parallel with other nodes.

The interconnects that link the nodes in each neighborhood are structured as a 3D geodesic architecture, with xy, yz and xz (top-down, right-left and front-back) directionality in each neighborhood cluster. These interconnects are like multi-lane roads with two-way traffic. The advantage of using two-way interconnects is to maintain efficiency; employing two one-way connections is not an efficient use of space.

In another embodiment of the invention, each node contains an RF wireless transmitter and receiver for broadcasting data to and receiving data from other nodes. Each node uses a separate bandwidth frequency for identification.

(2) 3D Torus Interconnect and Via Network for Layer to Layer Intranode Connection in 3D NoC and Method for Routing Therein The use of through silicon vias (TSVs) in a 3D circuit allows the layers of each node to be connected. The present invention uses multiple TSV connections between each adjacent layer and multiple TSVs between non-adjacent layers. In particular, TSVs connect tiles of circuitry on a specific layer to tiles on other layers in the multi-layer integrated circuit. One way to organize this model is to use a planar controller on the side of the multi-layer chip that has access to each layer, much like a bank of elevator shafts.

The present system uses a 3D torus interconnect and via network to connect different layers within a multi-layer circuit and to route information from point to point. This model links the top and bottom layers by using an intermediary layer in the middle. The system's use of intra-layer TSVs maintains extreme efficiency.

In one configuration, alternating memory layers are sandwiched between logic layers. The memory layers have controllers that manage the memory features plus a routing mechanism that routes data to top and bottom layers.

The present system uses a TSV model of inverted broad-based pyramid structures within specific layers. The pyramid structures etch the TSVs in a configuration to connect tiles of specific layers to tiles of adjacent layers. This pattern is reproduced to connect tiles of multiple layers beyond the adjacent layers.

In this model, the interconnects and TSVs connecting the layers in the center of the 3D circuit are more used than peripheral layers. Consequently, the interconnects and TSVs in the central layers have a higher bandwidth than the interconnects and TSVs on the periphery of the chip. Their central location is more strategic and will require increased throughput capability.

(3) Arc Benes Network for Rearrangable Inter-node Connection in 3D NoC

There are eight neighborhood clusters in an NoC organized in a 3D arc Benes network configuration. The 3D Benes network is a form of fat tree communications architecture that connects nodes with vertical and horizontal interconnects in a geometrical configuration similar to the corner of a box. In the present system, the precise constitution of the set of nodes comprising a neighborhood cluster is variable. While the exterior node in each corner and the interior node in each corner are always included in the network cluster configuration, the addition of adjoining nodes will vary contingent upon a specific application. Generally, a neighborhood cluster configuration will have at least four nodes but may have as many as eight. This ad hoc, flexible and on-demand configuration of a neighborhood cluster provides maximum reprogrammability functioning of the overall NoC so as to optimize operations for various applications.

The 3D arc Benes network model uses the interior node and the exterior node of each SoC cubic configuration corner as shared router nodes. The peripheral nodes in the neighborhood will congregate and readjust into specific clusters around these two nodes.

The nodes in a neighborhood cluster have point to point connections. Since the constitution of neighborhood cluster configurations periodically vary, the point to point connections extend to the potential nodes in adjacent neighborhoods. The 3D arc Benes network represents a hybrid connection architecture that optimizes this point to point interconnection scheme between individual nodes as well as the connection architecture between the individual nodes in a neighborhood and the two corner nodes.

Because the interconnects are two-way, they route data in either direction between nodes simultaneously, thereby maximizing throughput capabilities.

The variable neighborhood configuration is critical in order to maintain adaptability and plasticity in 3D NoC reprogramming behaviors.

(4) 3D Clos 8-point Internode Interconnect Structure Using Globally Asynchronous Locally Asynchronous (GALA) Method for Hybrid Hierarchical Network in 3D NoC While the neighborhood cluster architecture is useful to divide functions in a reprogrammable SoC, the challenge of connecting the octagonal clusters remains. The present system connects the eight neighborhood clusters organized into the corners of a cubic configuration by using a 3D clos network configuration. The inner nodes of each corner connect each neighborhood cluster to an interior connection matrix that connects both the central master core and the other neighborhood clusters.

Though connected to other parts of the 3D NoC network, each neighborhood cluster operates independently and uses its own adjustable clocking regulatory mechanism. This timing schema provides a locally asynchronous process in which each neighborhood cluster's node clocks are adjustable. This asynchronicity is necessary to accommodate the variable composition of each cluster. Once the set of nodes in each cluster is arranged for a particular application, the clocking for the nodes is harmonized for that application.

The linkage of clocking speeds with the other neighborhoods is also asynchronous because other neighborhoods are continuously modifying their clocking structures and thus their variable clocking synchronicity. The linkage of the neighborhoods with the central master core produces a clocking mechanism that is in perpetual disequilibrium.

The advantage of utilizing the GALA network architecture is the construction of a push-pull functional model. From the "top", data are pushed to the eight neighborhood clusters. From the "bottom", data are pulled from the neighborhoods.

Each neighborhood has a multilevel switch used to route traffic flows between neighborhoods and between the neighborhoods and the central core. These switches and their connections in a 3D environment reveal a double butterfly network configuration, a layer of switches that stand in a hierarchy between the neighborhoods and the central core. There is more bandwidth upstream, that is, towards the central core, and, correlatively, relatively less bandwidth downstream in the neighborhoods.

(5) Double Wishbone 2D Torus Ring Network Structure in 3D NoC

The eight switches in the interior of each neighborhood cluster are connected to a two dimensional torus ring that is on the outside of the central master node. The torus ring is structured in a double wishbone configuration that loops around the central node and connects to each neighborhood switch. There are four switches in the 2D torus ring that connect to the eight neighborhood switches that correspond to the facade of each of the four sides of the cube.

In another embodiment of the present invention, two 2D torus rings are organized around an axis. One ring is ordered at the axis of the plane corresponding to the sides of the 3D SoC cube, while the other ring is structured at the axis of a plane at ninety degrees. The two rings meet at the edges in order to exchange information at their conjoining two switches. This model provides fault tolerance capabilities because if one of the rings is disabled, the system is still operational.

In a further embodiment of the invention, the 2D torus rings are connected to opto-electronic integrated circuits in order to process very high bandwidth communications. The advantage of the opto-electronic circuits integrated into the 3D NoC is maintenance of high bandwidth at the top of the network hierarchy that connects the master node to the neighborhood clusters.

(6) QoS Optimization of 3D NoC Interconnects with Priority Based Model

Quality of service (QoS) techniques are stochastic processes used to ensure high quality solutions to complex networking problems. Specific algorithms, including shortest path and traveling salesman problem (TSP) algorithms, are employed for continuous load balancing. Solving network optimization problems that allocate resources based on changing priorities is a particular challenge of the present system.

Since the present system constantly readjusts its priorities, the speed of data flows is variable. The recalibration of processes according to varied criteria stimulates discontinuous change. The QoS algorithms optimize the modulating network architecture to accommodate plasticity behaviors.

(7) Intranode Multi-Way Router in 3D NoC

In order to maximize efficiency, the present system integrates a router into a layer of each 3D circuit node. Data from each 3D node are sent to the router from interconnects attached to each layer. Data are also received at the intra-nodal router and sent to multiple layers of the 3D IC. In order to accommodate the traffic flows at peak times, the router circuitry has built-in buffers that queue the data packets for orderly traffic flow within the network.

Nodes in different positions of the NoC emphasize the positioning of the routers in different locations within each node. The routers in opposite corners of the 3D NoC cube appear in different locations of their respective node.

Digital routers appear in the center layer of 3D ICs. However, analog components in routers appear on the periphery of 3D ICs because of their noise interference. In these cases, the peripheral layers have shielding to separate these layers from other layers in the 3D node.

(8) Differentiated Bandwidth Interconnects in Hierarchical 3D NoC

The network architecture in the 3D NoC is hierarchical, with higher bandwidth at the top, connecting the neighborhood clusters and the central master node, and relatively lower bandwidth at the bottom, connecting the individual nodes within each neighborhood. The middle layer consists of the eight switch subsystem that connects the top and bottom layers.

The top layer has high bandwidth capabilities, including implementations with opto-electronic switch circuitry. However, the neighborhood clusters generally have far less bandwidth, with interconnects of less width and less capacity among inter-nodal interconnects. The interconnects connecting the nodes to the switch have intermediate capacity, while the interconnects connecting the nodes to each other have smaller capacity. The interconnects and TSVs within a node are far smaller than internodal interconnects.

This network architecture model corresponds to the function of capillaries in natural circulatory systems, or the function of nerves in neural systems, in which the furthest periphery from the core has the narrowest capillaries or neurons.

The logic of the network architecture described here reveals a fail-safe functional advantage because if the pathways of one node are damaged, the system reroutes the network to optimize functionality of the remaining nodes.

(9) Adaptive Routing in Hierarchical 3D SoC Using Shortest Path Optimization for Load Balancing The present invention uses optimization algorithms to solve MOOPs involving data routing within the neighborhoods and between nodes in the whole network. The system uses hybrid adaptive routing algorithms to accommodate the two main levels of network control. For the intra-neighborhood routing protocols, the network uses minimally adaptive routing techniques, while the system uses fully adaptive techniques for global routing.

Adaptive routing approaches develop strategies that seek to avoid bottlenecks. In order to perform this network flow routing objective, the pathways used by the flow control process are optimized according to shifting priorities.

In the context of the 3D NoC, the system simultaneously optimizes the global routing with the local routing within the neighborhoods in order to maximize load balancing in a continuously recalibrating mechanism.

(10) Scheduled Routing in 3D NoC Using Buffer Modulation, Metadata and Time Multiplexing A master scheduler in the central core controls data traffic. Other schedulers are positioned in the eight neighborhood switches in order to control intra-neighborhood data traffic flows. The schedulers route priorities in the queues of the switches. The scheduling mechanisms use time-multiplexing to organize the logic of data flows.

A request for a flit is sent by a receiving router to a sending router. The receiving router then schedules traffic flow between the two routers. The two routers exchange credits and debits with the various requests for flit flows. Since the data flow exchange rate is typically variable, the data are buffered in the routers to modulate the flow control process.

Meta-tags are used to mark each data packet. Metadata for each task are read at each location in the flow control path and routed to the appropriate destination. Use of meta-tags is an efficient method of directing traffic to available nodes.

Arbitration scheduling in each switch is used to minimize latency by employing modulating queuing buffers. The scheduled routing of data flows is constantly modified as the demands on the system change and as the available resource supplies vary. In effect, each reservation of scheduling is a temporary reservation that is constantly updated to accommodate the load balancing of the global network.

The use of scheduling flow control by using meta-tags prevents resource conflicts so as to maximize network flow efficiencies.

(11) Opto-electronic Switch for Variable Mesochronous Clock Synchronization in 3D NoC Mesochronous clock synchronization refers to intermediation between the top and bottom layers in a hierarchical network. In the context of the 3D NoC, the clocks in the neighborhood node clusters use variable timing to modulate their operations to accommodate on-demand functions. The operation of the globally asynchronous locally asynchronous (GALA) model that connects the elements in the network hierarchy occurs in the middle layer. This mesochronous clock synchronization is constantly modulating between the top and bottom layers.

The multilayer mesochronous communication matrix controls the clocking between the top and bottom layers in the 3D NoC by using opto-electronic switches in the 2D torus ring(s). The integrated optical circuit uses an opto-coupler to interact with other optical circuits at the middle layer. The optical network connector transmits and receives data using a light emitting device and a light receiving device. Data are converted into pulses of light in the opto-electronic switch, while a tiny laser-on-chip transmits the light pulses to other opto-electronic switches. The optical signal is adjusted by using on-board amplifiers and attenuators, while a micromirror assembly is used to deflect the optical signal.

Though they are high bandwidth devices, the optical switches represent a bottleneck in the network at the input and output sections. The conversion and de-conversion of photonic signals are made by sections of the opto-electronic switch that contain substantial caching.

The combined opto-electronic switches in the 2D torus ring(s) comprise a photonic grid that connects high bandwidth switches with low power interconnects.

In another embodiment of the system, electronic circuitry is used in the switches in the 2D torus ring(s).

Performance Specifications
Bandwidth Specifications in the 3D NoC

|  | Economy | Standard | High Performance |
| --- | --- | --- | --- |
| Address Space for each Node | 128 Gb | 256 Gb | 256 Gb |
| Channel Width at Connecting Nodes | 256 bit wide channels | 512 bit wide channels | 512 bit wide channels |
| Bandwidth Throughput per Node | 4 Gb/s | 8 Gb/s | 16 Gb/sec |
| Throughput at 2D torus | 80 Gb/s | 160 Gb/s | 320 Gb/s |
| Total System Bandwidth | 140 Gb/s | 280 Gb/s | 560 Gb/s |

(II) 3D SoC Multi-chip Network Architecture

The 3D SoC networks with other chips to create a scalable high performance computing system. In this sense, the SoC is treated as a node in a computer network. The chip is designed to easily network with other SoCs for macro parallelization.

The present invention organizes networked SoCs to have external access to internal neighborhood clusters and nodes for inter-operational behaviors in a multi-extensive processing environment. In this high performance environment, rather than have eight neighborhoods and a central master node, the system has many neighborhood clusters operating autonomously yet interactively in the larger scalable system.

The present invention describes solutions to problems involving the integration and optimization of cubic SoC's in a parallel scalable computing environment.

The 3D SoC employs a cubic junction for networking with other SoCs. The junction connects nine lanes in a parallel switch within an SoC to other SoCs. These nine lanes connect to the eight neighborhood clusters and the central master node. This junction switch splits high bandwidth into nine pipelines in order to directly connect with each neighborhood and the master node. The system uses a fat tree interconnection configuration.

This model allows the direct access of various SoC neighborhoods to other SoC neighborhoods.

The high performance networking system uses optical transceiver circuitry at each neighborhood switch to control external traffic.

In another embodiment of the invention, each SoC neighborhood connects wirelessly to other SoCs using high-bandwidth RF technology.

(2) System and Method for Linking Multiple 3D SoC Nodes in Point-to-point Internodal Network The system is further organized in a network configuration that allows internodal communications. With hundreds of SoCs, thousands of nodes are organized as autonomous units. By numbering the nodes and organizing reconfigurable clusters of 3D circuits, the system accesses various nodes in a point-to-point configuration.

The nine pipeline junction connecting the chips allows access to each chip's double-wishbone 2D torus ring(s), which feed directly to specific neighborhood clusters. These pipelines then access individual nodes in each neighborhood. This point to point network connection configuration allows a more accessible strategy than nearest neighbor connection configurations.

The advantage of this connection configuration model is that it allows the direct interoperation of nodes beyond the neighborhood level. This is important particularly because the neighborhood configurations periodically change.

(3) System and Method for Autonomous Organization of 3D SoC in Scalable Parallel Computer Networks The 3D SoC is an intelligent chip because it contains reconfigurable, reprogrammable and auto-programmable features. When combined in highly parallel network systems, the SoCs programmability features produce a highly adaptive computer system capable of multi-petaflop performance.

Performance Specifications: High Performance Computing

|  | Economy | Standard | High Performance |
| --- | --- | --- | --- |
| Number of iSoCs in cube | 8 × 8 × 8 = 512 | 12 × 12 × 12 = 1728 | 24 × 24 × 24 = 13,824 |
| Number of cubes | 8 | 8 | 8 |
| Total number of iSoCs in System | 4096 | 13,824 | 110,592 |
| Total number of Nodes | 143,360 | 967,680 | 7,741,440 |
| 1.35 TFlop/s per Chip | 5.53 PFlop/s | 18.66 PFlop/s | 149.3 PFlop/s |
| 2 TFlop/s per Chip | 8.192 PFlop/s | 27.648 PFlop/s | 221 PFlop/s |
| 10 TFlop/s per Chip | 40.96 PFlop/s | 138.24 PFlop/s | 1 ExaFlop/s |

(1) Method for Stacking 3D SoCs Using a Cubic Junction Network Connection

One of the advantages of using the cubic configuration of the 3D SoC package is that it may be stacked in larger computing systems.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.) the terms (including a reference to a "means") used to describe such elements are intended to correspond, unless otherwise indicated, to any element that performs the specified function of the described element (i.e., that is functionally equivalent), even though not structurally equivalent to the disclosed structure that performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

Acronyms
3D, three dimensional
ASIC, application specific integrated circuit
BOOP, bi-objective optimization problem
CMOS, complementary metal oxide semiconductor
CPLD, complex programmable logic device
D-EDA, dynamic electronic design automation
DIVA, data intensive architecture
DLP, data level parallelism
EDA, electronic design automation
EHW, evolvable hardware
eMOOP, evolvable multi-objective optimization problem
Flops, floating operations per second
FPCA, field programmable compute array
FPGA, field programmable gate array
GALA, globally asynchronous locally asynchronous
HPPS, high performance processing system
ILP, instruction level parallelism
IP, intellectual property
iSoC, intelligent system on a chip
MEMS, micro electro mechanical system
MONARCH, morphable networked micro-architecture
MOOP, multi-objective optimization problem
MPSOC, multi-processor system on a chip
NEMS, nano electro mechanical system
NoC, network on a chip
PCA, polymorphous computing architecture
PIM, processor in memory
QoS, quality of service
RISC, reduced instruction set computing
SCOC, supercomputer on a chip
SoC, system on a chip
SOI, silicon on insulation
SOPC, system on a programmable chip
SPE, synergistic processor element
TLP, thread level parallelism
TRIPS, Tera-op reliable intelligently adaptive processing system
TSV, through silicon via
ULSI, ultra large scale integration
VLSI, very large scale integration
WSPS, wafer level processed stack packages

DETAILED DESCRIPTION OF THE DRAWINGS

Figure 1:
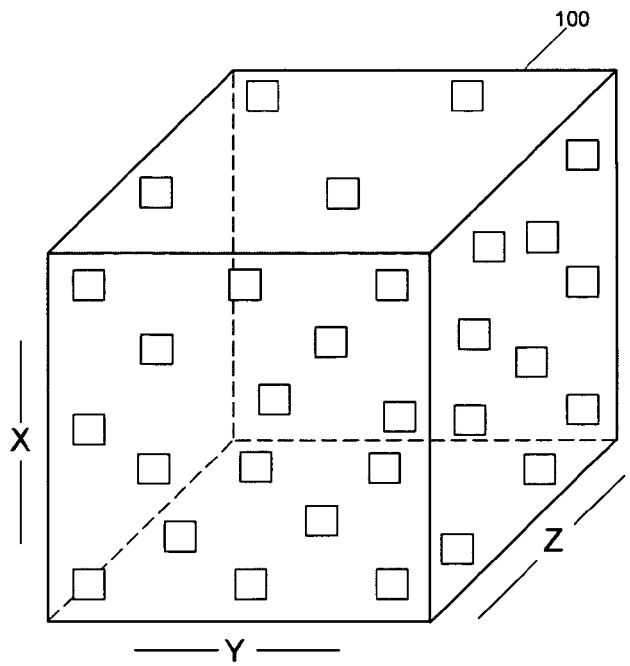
FIG. 1 is a schematic diagram of a three dimensional SoC with multiple nodes.
Figure 2:
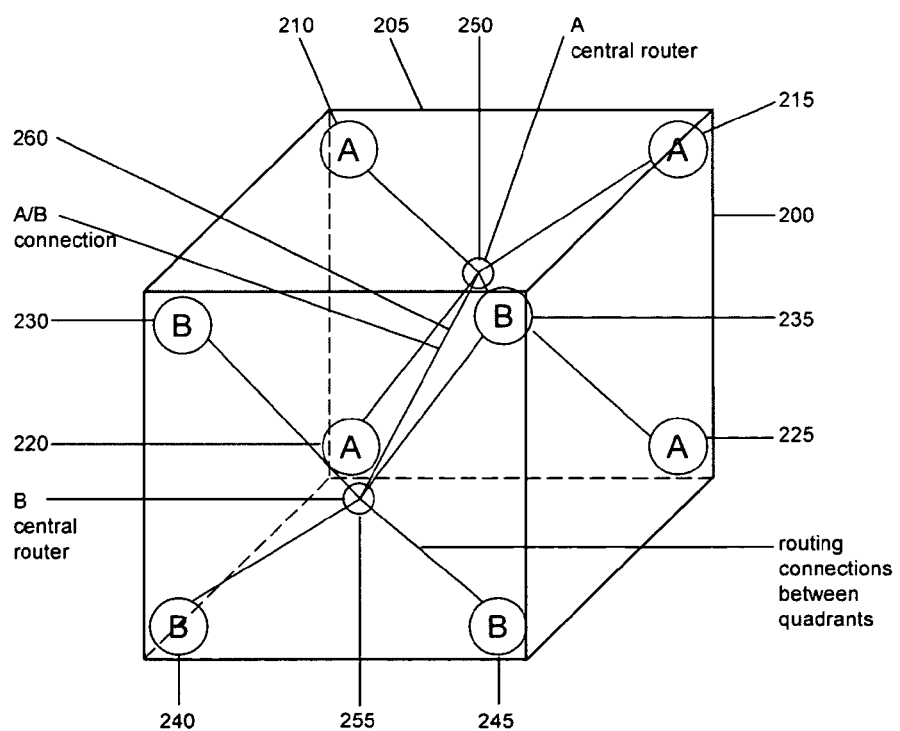
FIG. 2 is a schematic diagram of a three dimensional SoC highlighting the central routers connecting two sets of four nodes in each hemisphere.

FIG. 1 shows a three dimensional SoC (100) with multiple nodes along cubic X, Y and X dimensions. FIG. 2 shows a 3D SoC highlighting the central routers connecting two sets of four nodes in each hemisphere. The sections shown by an "A" (210, 215, 220 and 225) are on the outside facade of the SoC (205), while the sections shown by a "B" (230, 235, 240 and 245) are on the inside facade of the SoC. The nodes in the A section clusters are connected to a central router (250) that routes data between quadrants and the nodes in the B section clusters are connected to a central router (255). The two routers are connected in order to share data by using the A/B connection (260).

Figure 3:
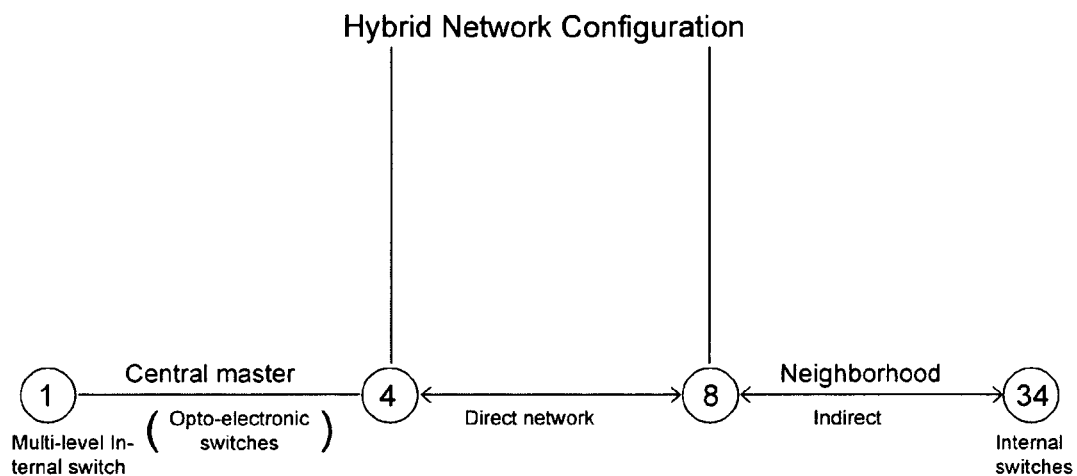
FIG. 3 is a drawing illustrating the network components of a 3D SoC with a hybrid network configuration.

FIG. 3 shows the network components of a 3D SoC with a hybrid network configuration. The system features one central master node which contains a multi-level internal switch. The central node is connected to four direct network routers with opto-electronic switches. The network connects the four network routers to eight neighborhood clusters. Each of the 34 nodes (excluding the central node) contains internal switches.

Figure 4:
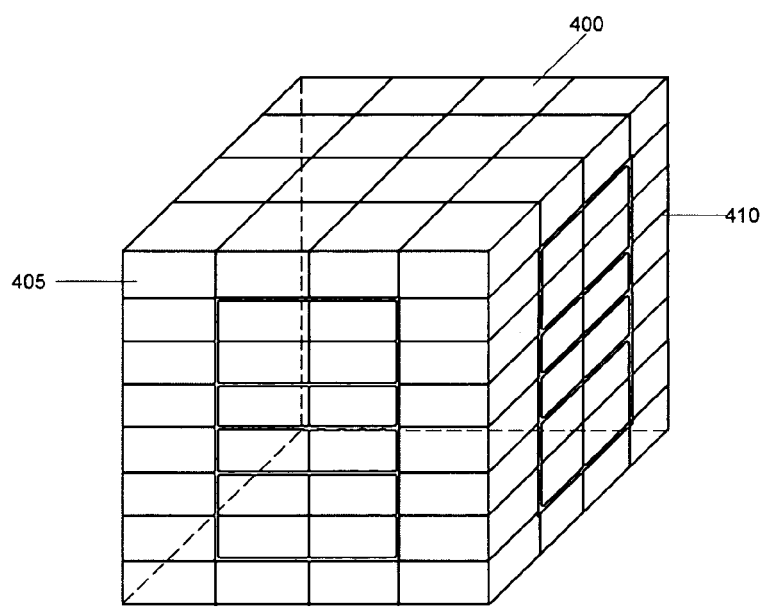
FIG. 4 is a schematic diagram showing a 3D torus in a 3D SoC in an interconnect and TSV network.

FIG. 4 shows a 3D torus in a 3D SoC in an interconnect and TSV network. The side view of the 3D torus consists of the vertical TSVs and the horizontal interconnects as highlighted.

Figure 5:
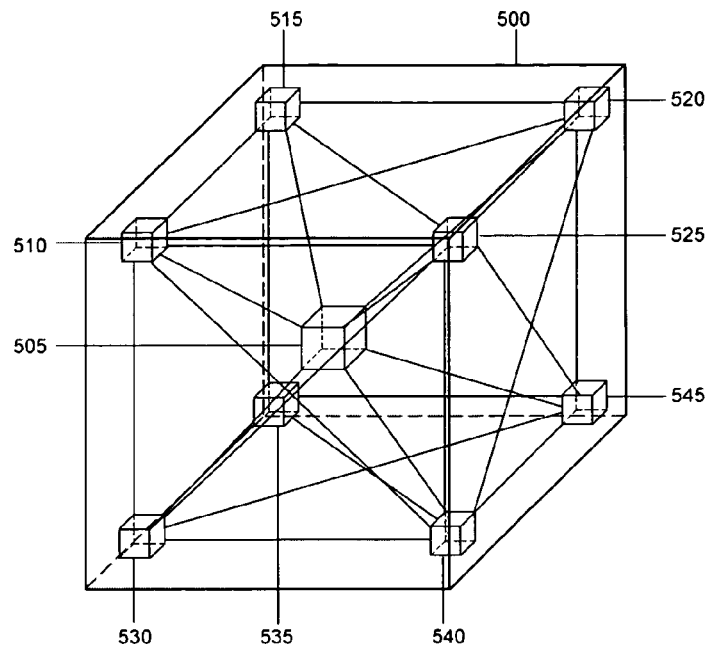
FIG. 5 is a schematic diagram showing an arc benes network in a 3D SoC.

FIG. 5 shows an arc benes network in a 3D SoC. The central node (505) is connected to the nodes in the corners of the SoC (510, 515, 520, 525, 530, 535, 540 and 545). Each of the nodes are connected to neighboring nodes in the arc benes configuration.

Figure 6:
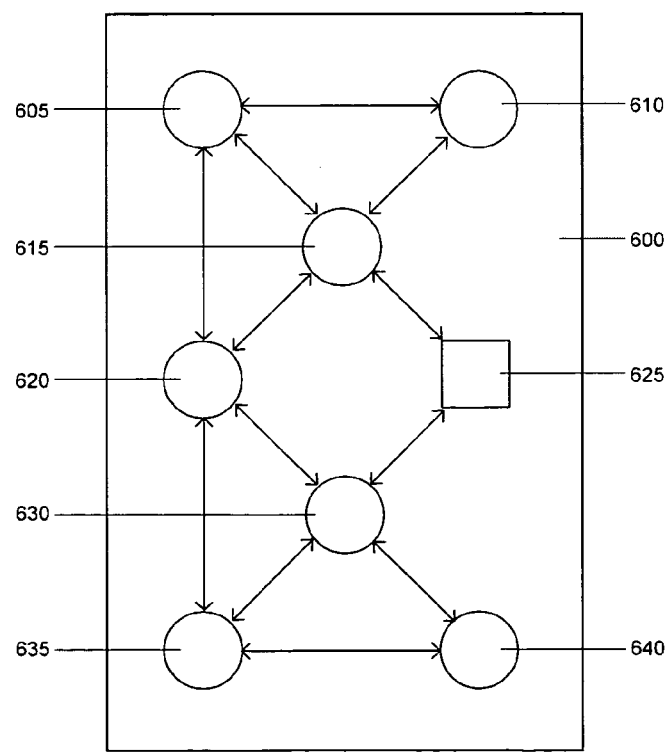
FIG. 6 is a schematic diagram showing a double wishbone interconnect topology model in a 3D SoC.

FIG. 6 shows a double wishbone interconnect topology model in a 3D SoC. In this network configuration, the nodes at 620, 635, 630 and 640 comprise a neighborhood cluster and they are interconnected to each other and to the central node (625). Nodes at 605, 610 and 615 are connected to each other in another neighborhood cluster and to the node at 620 and the central node (625).

Figure 7:
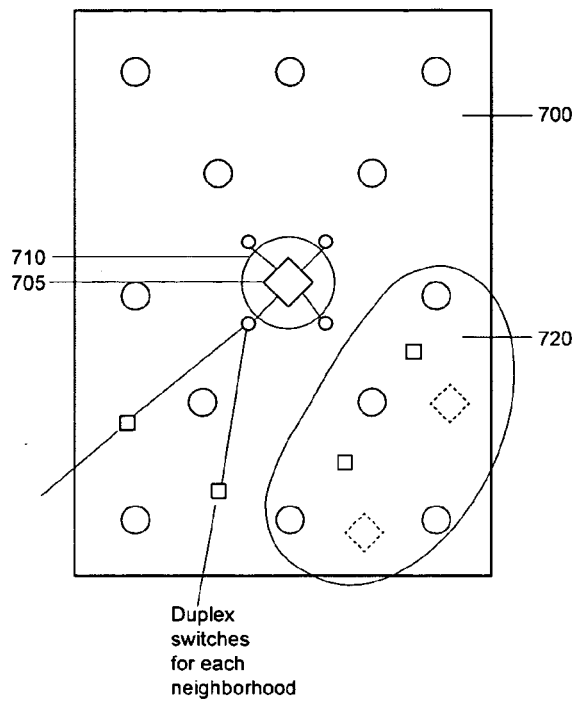
FIG. 7 is a schematic diagram showing the neighborhood node connections of two neighborhoods and a central core in a 3D SoC.

FIG. 7 shows the neighborhood node connections of two neighborhoods and a central core in a 3D SoC. The drawing shows a facade perspective of a neighborhood cluster (720) with duplex switches (squares) for each neighborhood to route data between neighborhood nodes. The central node is shown at 705. A set of routers (710) are shown in a configuration around the central node to control the neighborhood data streams as the neighborhood clusters interact with the central node.

Figure 8:
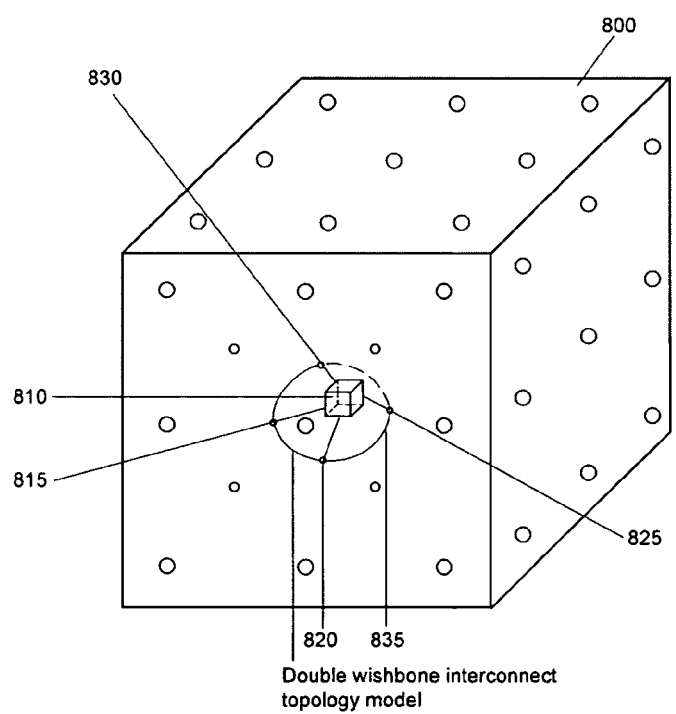
FIG. 8 is a schematic diagram showing a side view of neighborhood clusters in a 3D SoC connected to the central node by duplex switches.

FIG. 8 shows a view of neighborhood clusters in a 3D SoC connected to the central node by duplex switches. The routers (815, 820, 825 and 830) connecting the central node (825) and the neighborhood clusters are configured in a double wishbone topology configuration (835).

Figure 9:
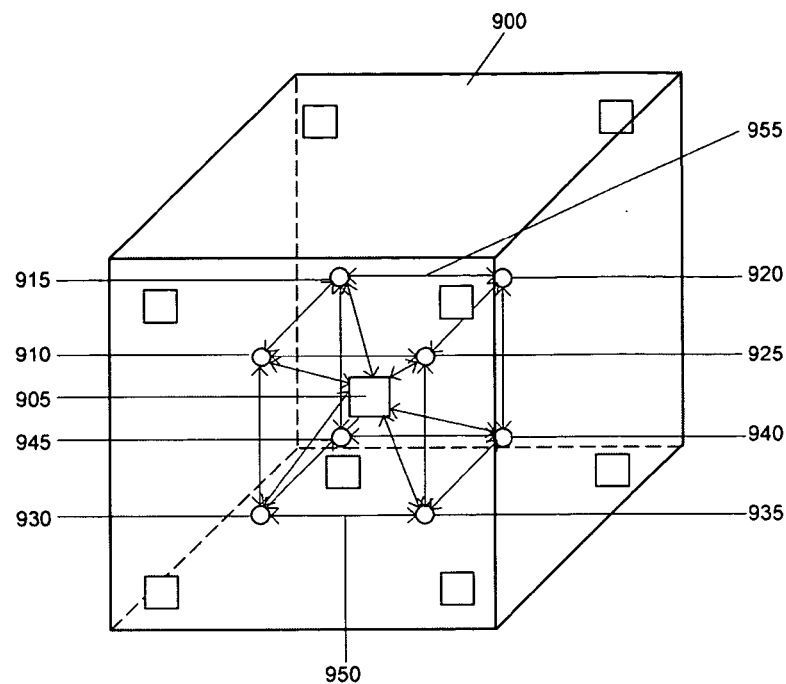
FIG. 9 is a schematic diagram showing a 3D SoC with a clos 8-point internode interconnect network architecture connecting internal neighborhood nodes in a matrix.

FIG. 9 shows a 3D SoC (900) with a clos 8-point internode interconnect network architecture connecting internal neighborhood nodes in a matrix. The matrix (955) consists of nodes at 910, 915, 920, 925, 930, 935 and 940. The nodes correspond to each neighborhood cluster and connect the clusters, through the connection matrix, to each other.

Figure 10:
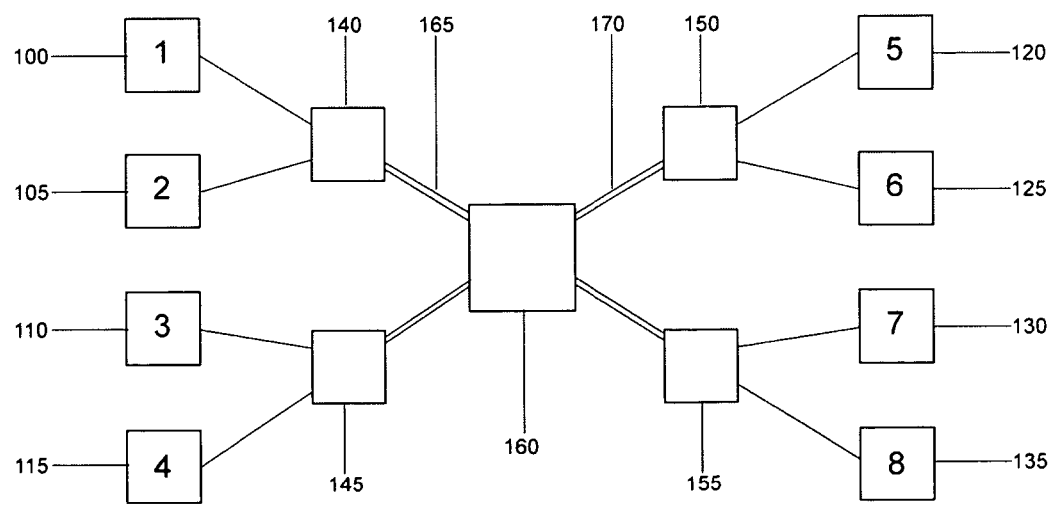
FIG. 10 is a schematic diagram showing a double butterfly network configuration connecting eight neighborhoods of a 3D SoC to inner node switches and to a central node in which there is increased bandwidth upstream.

FIG. 10 shows a double butterfly network configuration connecting eight neighborhoods of a 3D SoC to inner node switches and to a central node in which there is increased bandwidth upstream. The eight neighborhood nodes are specified by 1-8 (100, 105, 110, 115, 120, 125, 130 and 135). The four inner node switches (140, 145, 150 and 155) are connected to the neighborhood node routers and to the central node (160). The bandwidth, as indicated by double lines, connecting the four inner node switches to the central node (at 165 and 170), is higher than at the level of the neighborhood connections.

Figure 11:
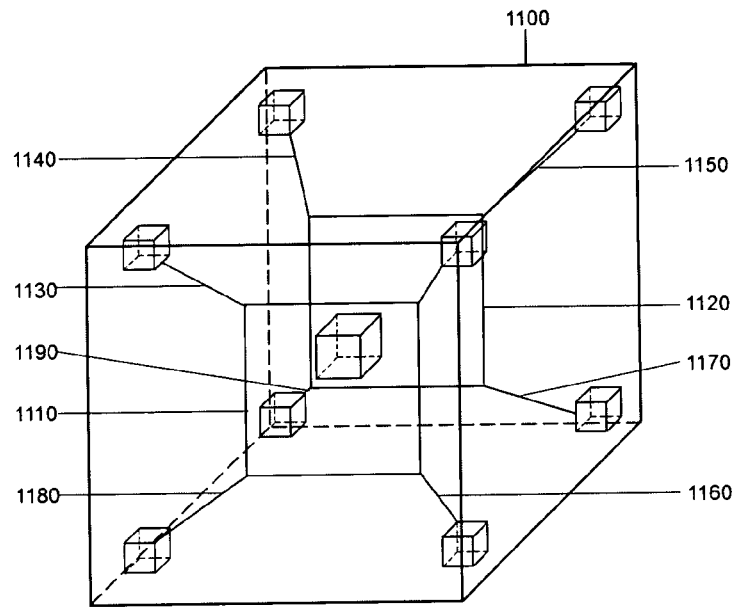
FIG. 11 is a schematic diagram showing two 2D torus rings organized around an axis connecting nodes in two hemispheres of a 3D SoC.
Figure 12:
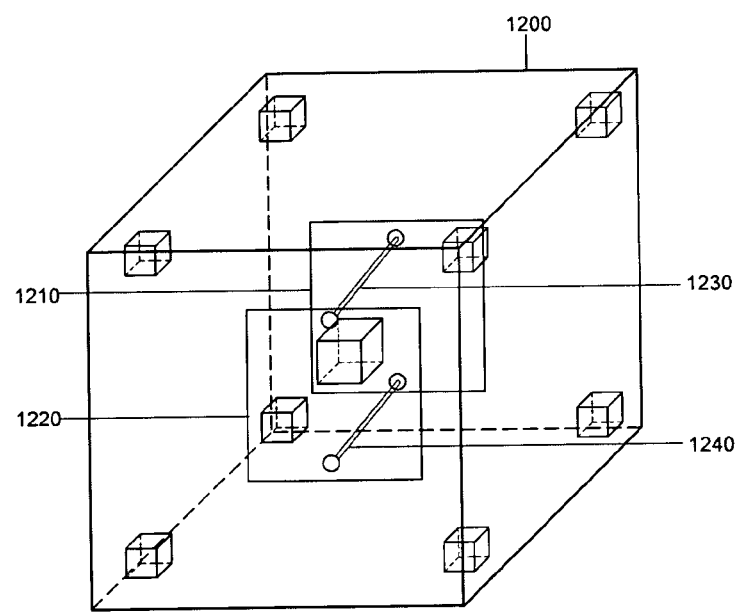
FIG. 12 is a schematic diagram showing opto-electronic switches connected to two 2D torus rings along an axis in a 3D SoC.

FIG. 11 shows two 2D torus rings organized around an axis connecting nodes in two hemispheres of a 3D SoC. One torus ring is shown at 1110, while the other is shown at 1120. Each ring connects neighborhood clusters (1130, 1160 and 1180 to the closest ring and 1140, 1150, 1170 and 1190 for the outer ring). FIG. 12 shows the use of opto-electronic switches connected to two 2D torus rings along an axis in a 3D SoC. The connections between and inner (1220) and outer (1210) torus rings are shown at 1230 and 1140. These opto-electronic devices send data between the rings at high data rates.

Figure 13:
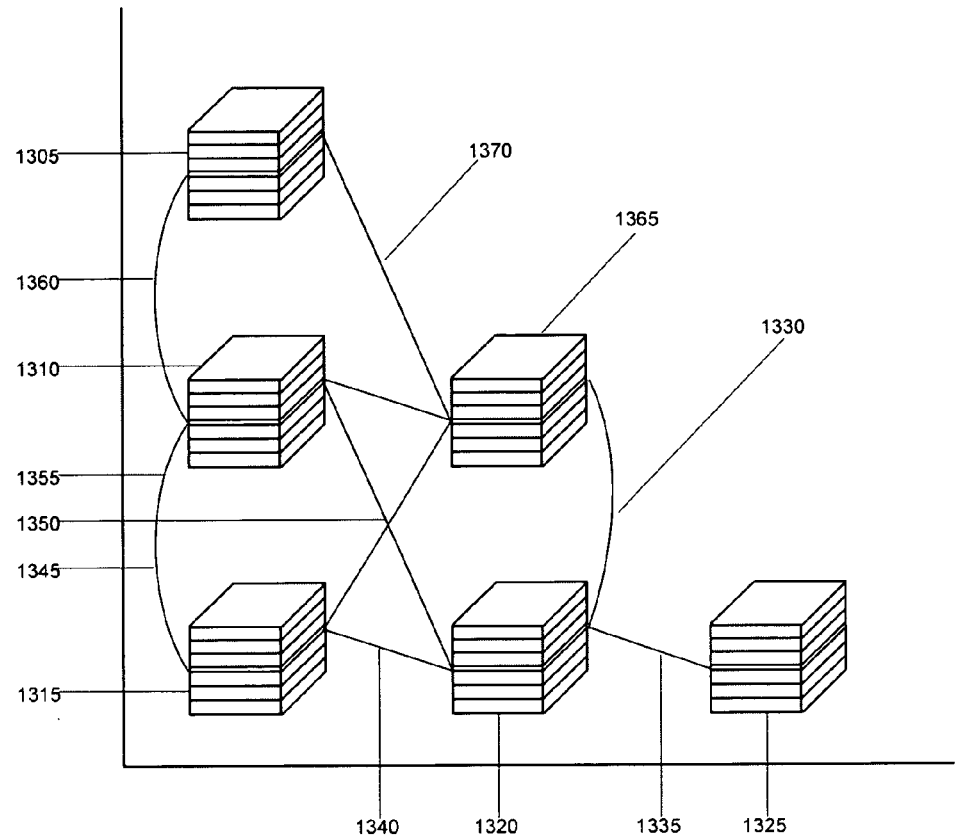
FIG. 13 is a schematic diagram illustrating the intra-node multi-way router on layers of multilayer IC nodes connecting nodes in a neighborhood cluster of a 3D SoC.

FIG. 13 shows the intra-node multi-way router on layers of multilayer IC nodes connecting nodes in a neighborhood cluster of a 3D SoC. The nodes (1305, 1310, 1315, 1320, 1325 and 1365) contain intra-node routers within specific layers of the nodes. The routers relay data streams between the nodes in the neighborhood cluster (1330, 1335, 1340, 1345, 1350, 1360 and 1370).

Figure 14:
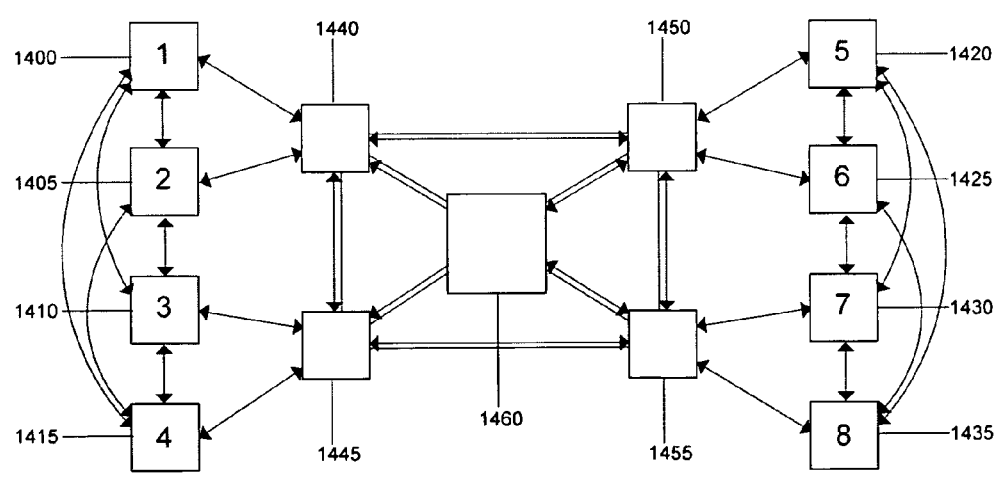
FIG. 14 is a schematic diagram showing the configuration of nodes in several clusters of a 3D SoC.

FIG. 14 shows the configuration of nodes in several clusters of a 3D SoC. Using the double butterfly network configuration shown in FIG. 10, the routing is shown between the neighborhoods of each hemisphere (1400, 1405, 1410 and 1415 on the left side and 1420, 1425, 1430 and 1435 on the right side). Data sets then move between the network connection of the individual neighborhood clusters and the inner routers (1400, 1405 and 1440; 1410, 1415 and 1445; 1420, 1425 and 1450; and 1430, 1435 and 1455). The data sets move between the inner adjacent nodes (1440, 1445, 1450 and 1455) and between the inner nodes and the central node (1460) with increased bandwidth.

Figure 15:
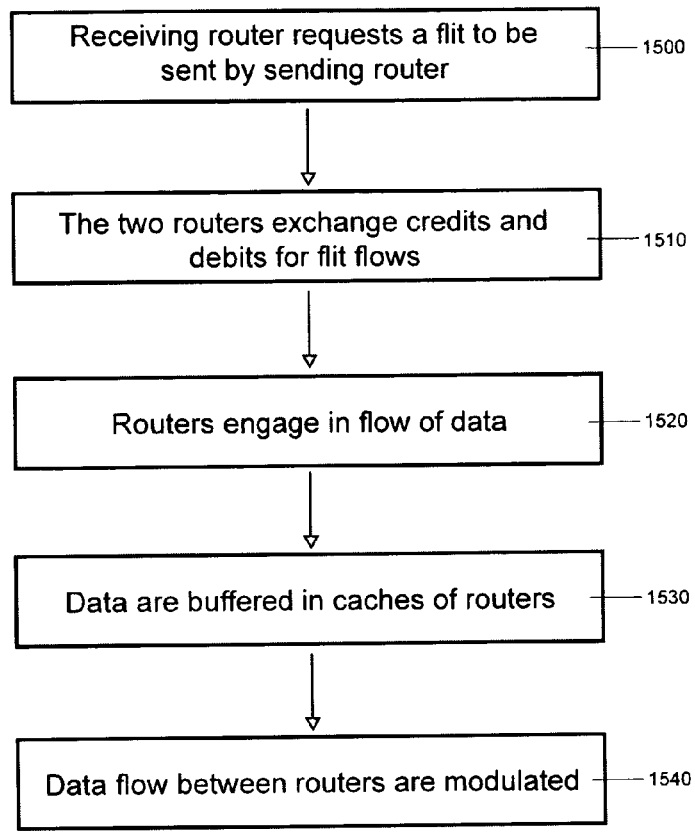
FIG. 15 is a flow chart showing the processing of data in routers in a multilayer SoC.

FIG. 15 is a flow chart showing the processing of data in routers in a multilayer SoC. A receiving router requests a flit to be sent by a sending router (1500) and the two routers exchange credits and debits for flit flows (1510). The routers engage in a flow of data (1520) and data are buffered in caches of the routers (1530). The data flows between the routers are then modulated (1540).

Figure 16:
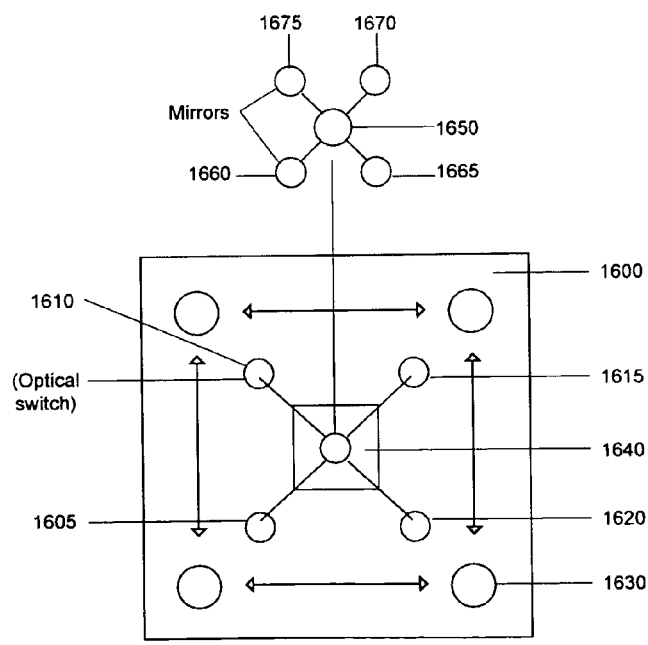
FIG. 16 is a schematic diagram showing four optical switches used to transmit data in a 3D SoC.

FIG. 16 is a schematic diagram showing four optical switches used to transmit data in a 3D SoC (1600). The optical switches (1605, 1610, 1615 and 1620) are connected to each other and to the central node (1640). The cut out of the SoC shows the mirrors in the highlighted area for mirrors (1660, 1665, 1670 and 1675) surrounding the central node (1650).

Figure 17:
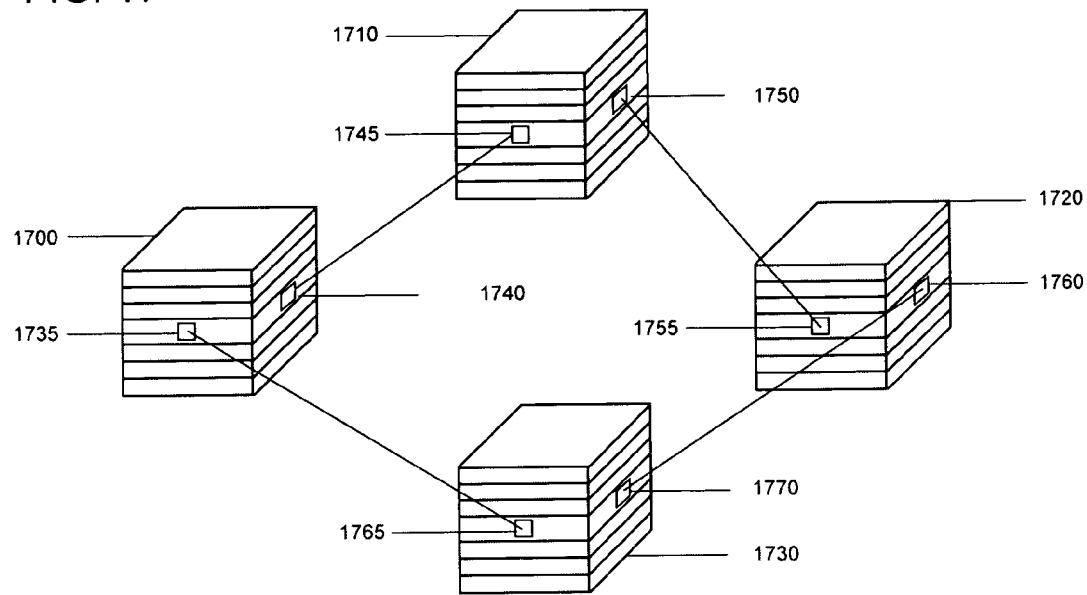
FIG. 17 is a schematic diagram showing the use of internal routers in layers of multilayer ICs as they exchange data flows between 3D nodes.

FIG. 17 shows the use of internal routers in layers of multilayer ICs as they exchange data flows between 3D nodes. The routers, specified at 1745 and 1750 in node 1710, 1735 and 1740 in node 1700, 1765 and 1770 in node 1730 and 1755 and 1760 in node 1720, exchange data sets between the nodes. Each pair of routers are coordinated to interact with specific nodes.

Figure 18:
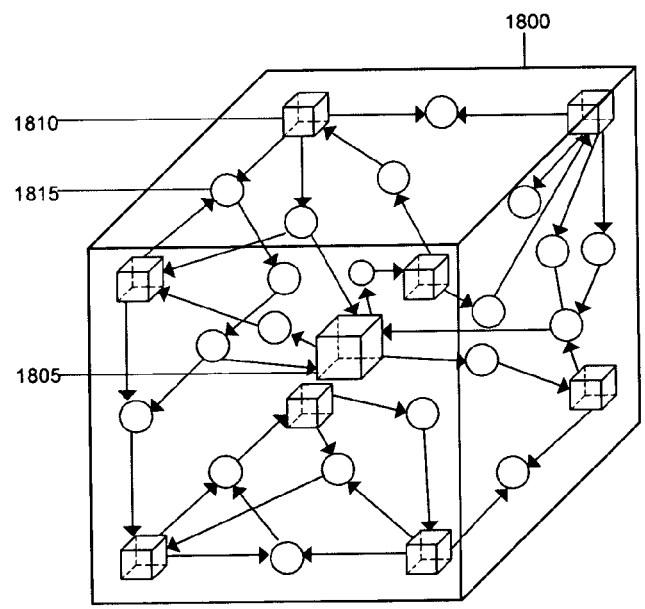
FIG. 18 is a schematic diagram showing the flow of data across 3D nodes in a 3D SoC.
Figure 19:
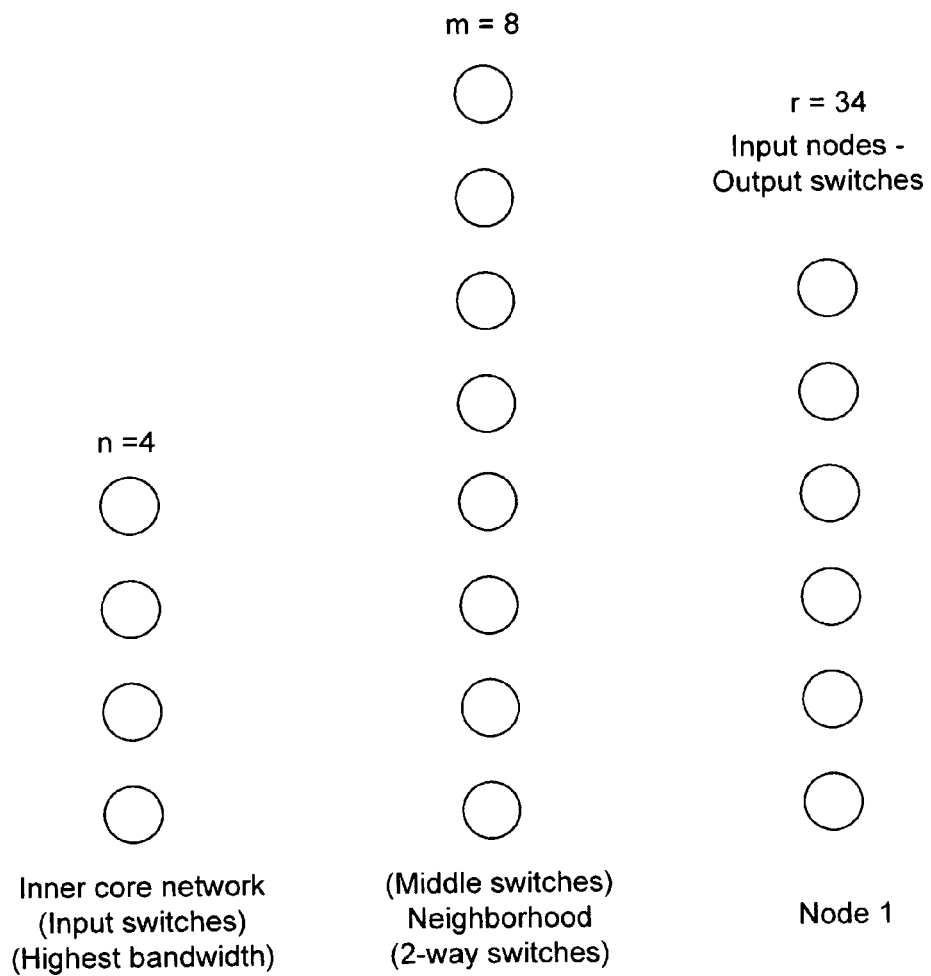
FIG. 19 is a schematic diagram showing the configuration of inner core switches, middle neighborhood switches and output switches in a 3D SoC.

FIG. 18 shows the flow of data across 3D nodes in a 3D SoC. The nodes in the corners of the SoC (1800), indicated by cubic configurations, interact with other nodes in the system, indicated by circles. The central node is shown at 1805. FIG. 19 shows the configuration of inner core switches, middle neighborhood switches and output switches in a 3D SoC. The inner core network, with four nodes, has the highest bandwidth, while the middle switches, which are two-way, in the neighborhood clusters, consist of eight nodes. The thirty four nodes in the system (plus the central node) contain switches to send and receive data from other sources.

Figure 20:
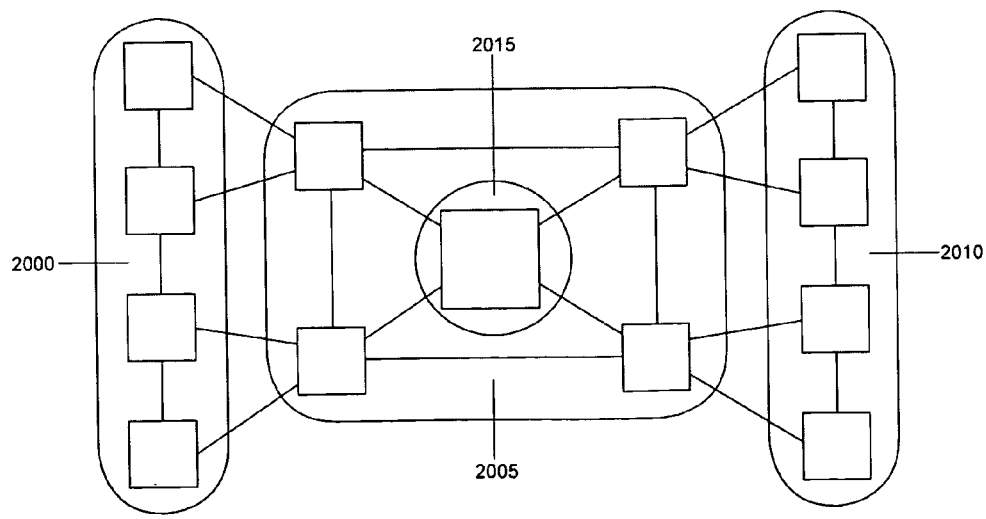
FIG. 20 is a schematic diagram showing the different timing of a GALA model in a 3D SoC.

FIG. 20 shows the different timing of a GALA model in a 3D SoC. In the left set of neighborhood clusters (2000), the clock timing is different from the clock timing in the right set of neighborhood clusters (2010). This set of clocks is timed differently from the inner connections (2005), which is different than the clock timing of the central node (2015). The variable timing of the clocks allows one set of nodes to be active at different times, and to perform at different rates, than other sets of nodes, thereby maximizing efficiency of overall load for multiple differentiated application functions.

Figure 21:
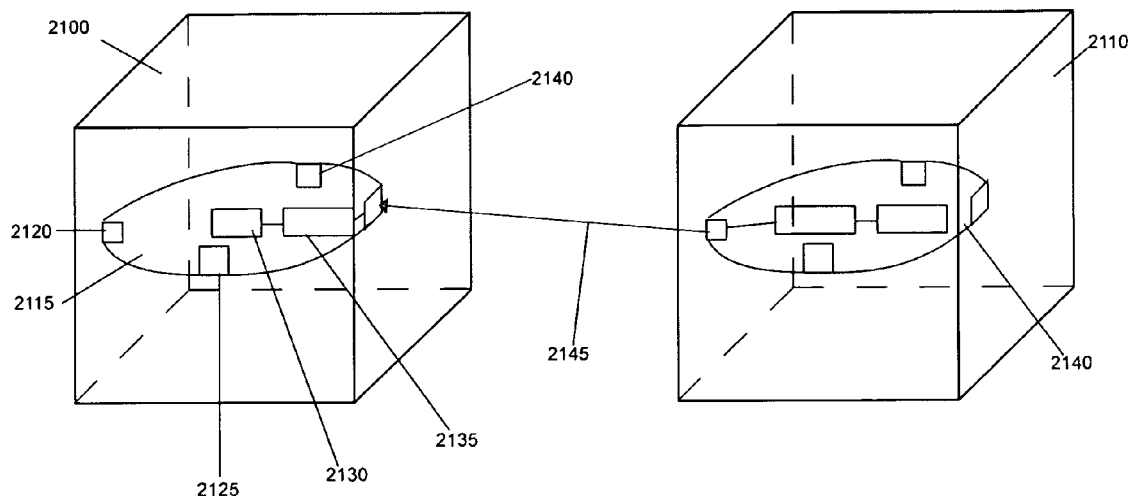
FIG. 21 is a schematic diagram showing the use of opto electronic switches on a layer of each of two interacting 3D IC nodes configured in a photonic grid in which each laser-on-chip layer consists of a onboard amplifier and attenuator with a micro-mirror assembly.

FIG. 21 shows the use of opto electronic switches (2120, 2140 and 2125) on a layer of each of two interacting 3D IC nodes configured in a photonic grid (2140 and 2115) in which each laser-on-chip layer consists of a onboard amplifier and attenuator (2130) with a micro-mirror assembly (2135). The two opto electronic layers interact at 2145 to exchange data streams. These devices are on the inner nodes of each neighborhood cluster.

Figure 22:
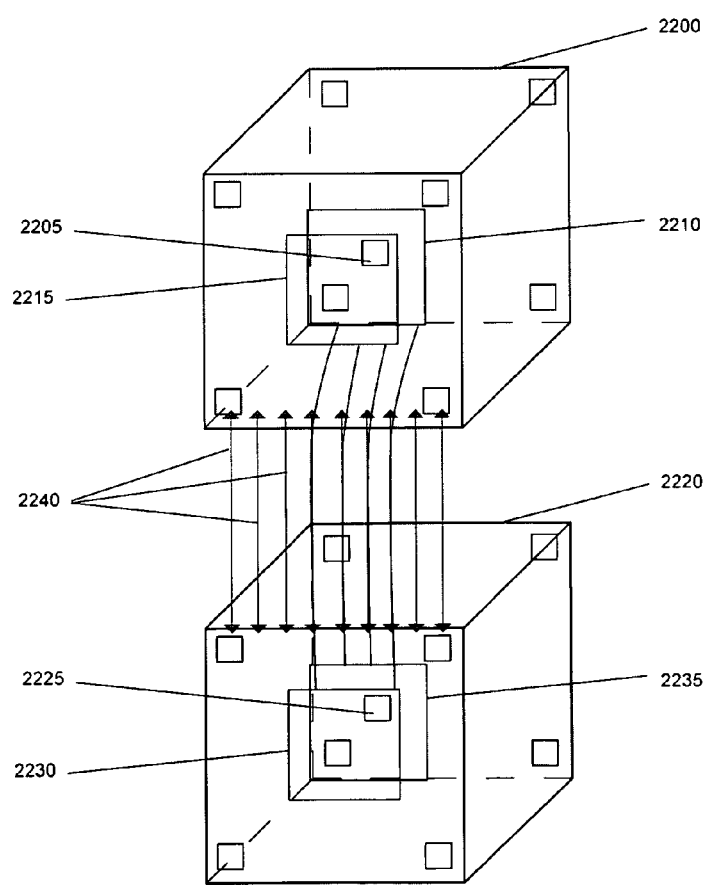
FIG. 22 is a schematic diagram showing two 3D SoCs connected by 9 pins to the neighborhood nodes of each SoC.
Figure 23:
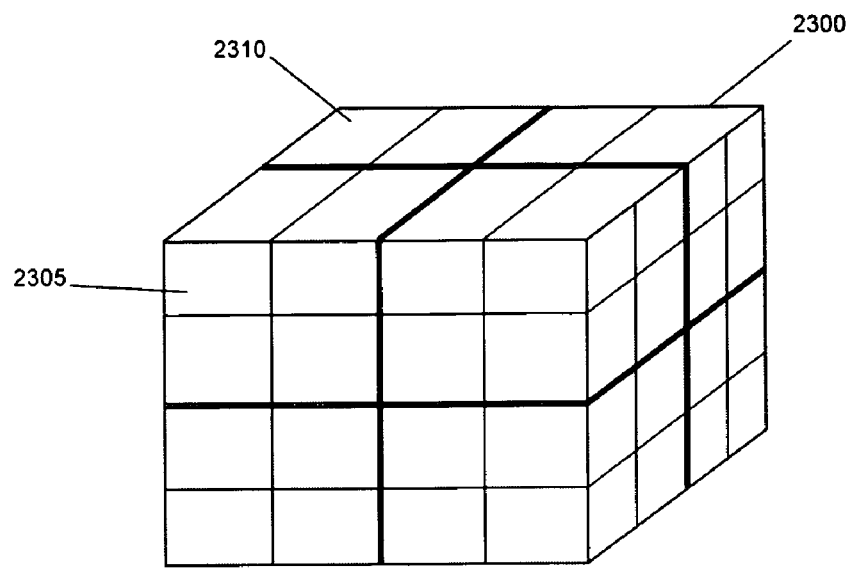
FIG. 23 is a schematic diagram showing the combination of multiple 3D SoCs into a network package of 64 SoCs.
Figure 24:
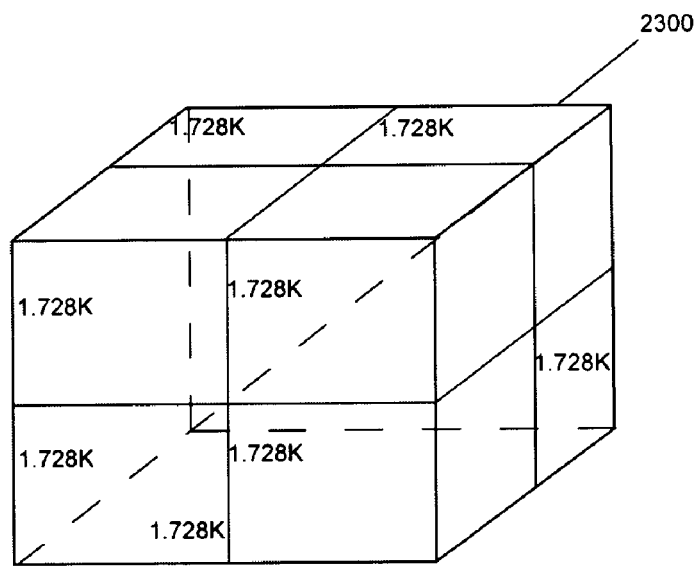
FIG. 24 is a schematic diagram showing the combination of 8 blocks of 1728 SoCs into a network of 13,824 SoCs.

FIG. 22 shows two 3D SoCs connected by nine pins (2240) to the neighborhood nodes of each SoC. By connecting the neighborhoods of one SoC (2200) to those of another (2220), the SoC network is scalable. FIG. 23 shows a combination of multiple 3D SoCs into a network package of 64 SoCs. Each cubic SoC is stacked in a cubic configuration of 64 total SoCs. Each SoC neighborhood is connected to each other by the pins in the package. The SoC network is further scalable as illustrated in FIG. 24, which shows the combination of eight blocks of 1728 SoCs into a network of 13,824 SoCs for supercomputing capabilities.

I claim:

1. A network on a chip (NoC) apparatus in a three dimensional system on a chip (SoC), comprising:
   a set of 34 3D integrated circuit (IC) nodes configured into clusters;
   a central node positioned in the middle of the SoC;
   at least two central routers positioned in each of at least two hemispheres of neighborhood clusters;
   wherein data are input into each of the routers from each of the hemispheres of neighborhood clusters;
   wherein data are exchanged between the routers; and
   wherein data are exchanged between the routers and the central node.

2. The network of claim 1, wherein:
   the routers are positioned in a double wishbone configuration; and
   the network is configured to use duplex switches to connect the routers to interconnects connected to the individual neighborhood nodes.

3. The network of claim 1, wherein:
   the 3D SoC network is configured to use clos 8-point internode interconnect network architecture connecting internal neighborhood nodes in a matrix; and
   the neighborhood clusters are connected using a connection matrix.

4. The network of claim 1, wherein:
   the 3D SoC network is configured into a 3D double butterfly network architecture to connect the eight neighborhood clusters; and
   the network features higher bandwidth connecting the inner nodes to the routers than the network components that connect the neighborhood nodes.

5. The network of claim 1, wherein:
   two two-dimensional torus rings are organized around an axis connecting nodes in at least two hemispheres of the 3D SoC; and
   two opto-electronic switches are used to connect to the two two-dimensional torus rings to maintain high data rates in the direct connection between the opto-electronic switches.

6. The network of claim 1, wherein:
   four optical switches are configured to connect the central node to at least two hemispheres of neighborhood clusters.

7. The network of claim 1, wherein:
   data flow between the 3D IC nodes within a neighborhood cluster using the interconnects connecting the nodes.

8. The network of claim 1, wherein:
   each neighborhood cluster uses a globally asynchronous locally asynchronous (GALA) system to differentiate the clocks of each neighborhood;
   each neighborhood clock is variable and adjusts to network flow requirements;
   when one neighborhood is at peak activity, other neighborhoods are maintaining less than peak activity; and
   the data exchanged between the neighborhood clusters are modulated by buffers in nodes between the neighborhoods as their clocks use the GALA system.

9. The network of claim 1, wherein:
   the 3D SoC connects the eight neighborhood clusters and the central node to interconnects that connect to nine pins on the external surface of one façade of the 3D SoC; and
   the individual neighborhood clusters and central node access external devices by the nine pins.

10. A network on a chip (NoC) apparatus in a three dimensional (3D) system on a chip (SoC), comprising:
    34 3D integrated circuit (IC) nodes configured into neighborhood clusters;
    a central 3D IC node in the middle of the SoC;
    wherein each of the 3D IC nodes contains a layer on which is configured an internal router to retrieve and send data; and
    wherein the internal router on each 3D IC layer is used to exchange data between nodes within and between a neighborhood cluster.

11. The network of claim 10, wherein:
    the router on a layer of a 3D IC is an opto-electronic switch;
    the opto-electronic switch consists of a layer-on-chip apparatus which contains an on-board amplifier, attenuator and micro-mirror assembly; and
    the 3D ICs with opto-electronic switches are contained in each of eight inner nodes within each neighborhood cluster.

12. The network of claim 10, wherein:
    the routers are positioned in a double wishbone configuration; and
    the network is configured to use duplex switches to connect the routers to interconnects connected to the individual neighborhood nodes.

13. The network of claim 10, wherein:
    the 3D SoC network is configured to use clos 8-point internode interconnect network architecture connecting internal neighborhood nodes in a matrix; and
    the neighborhood clusters are connected using a connection matrix.

14. The network of claim 10, wherein:
    the 3D SoC network is configured into a 3D double butterfly network architecture to connect the eight neighborhood clusters; and
    the network features higher bandwidth connecting the inner nodes to the routers than the network components that connect the neighborhood nodes.

15. The network of claim 10, wherein:
    two two-dimensional torus rings are organized around an axis connecting nodes in at least two hemispheres of the 3D SoC; and
    two opto-electronic switches are used to connect to the two two-dimensional torus rings to maintain high data rates in the direct connection between the opto-electronic switches.

16. The network of claim 10, wherein:
    four optical switches are configured to connect the central node to at least two hemispheres of neighborhood clusters.

17. The network of claim 10, wherein:
    data flow between the 3D IC nodes within a neighborhood cluster using the interconnects connecting the nodes.

18. The network of claim 10, wherein:

each neighborhood cluster uses a globally asynchronous locally asynchronous (GALA) system to differentiate the clocks of each neighborhood;

each neighborhood clock is variable and adjusts to network flow requirements;

when one neighborhood is at peak activity, other neighborhoods are maintaining less than peak activity; and the data exchanged between the neighborhood clusters are modulated by buffers in nodes between the neighborhoods as their clocks use the GALA system.

19. The network of claim 10, wherein:

the 3D SoC connects the eight neighborhood clusters and the central node to interconnects that connect to pins on the external surface of one façade of the 3D SoC; and the individual neighborhood clusters and central node access external devices by the pins.

\* \* \* \* \*